J. B. SCHUMAN.
SHOCK LOADER.
APPLICATION FILED OCT. 31, 1902. RENEWED FEB. 8, 1908.
938,438.
Patented Oct. 26, 1909.
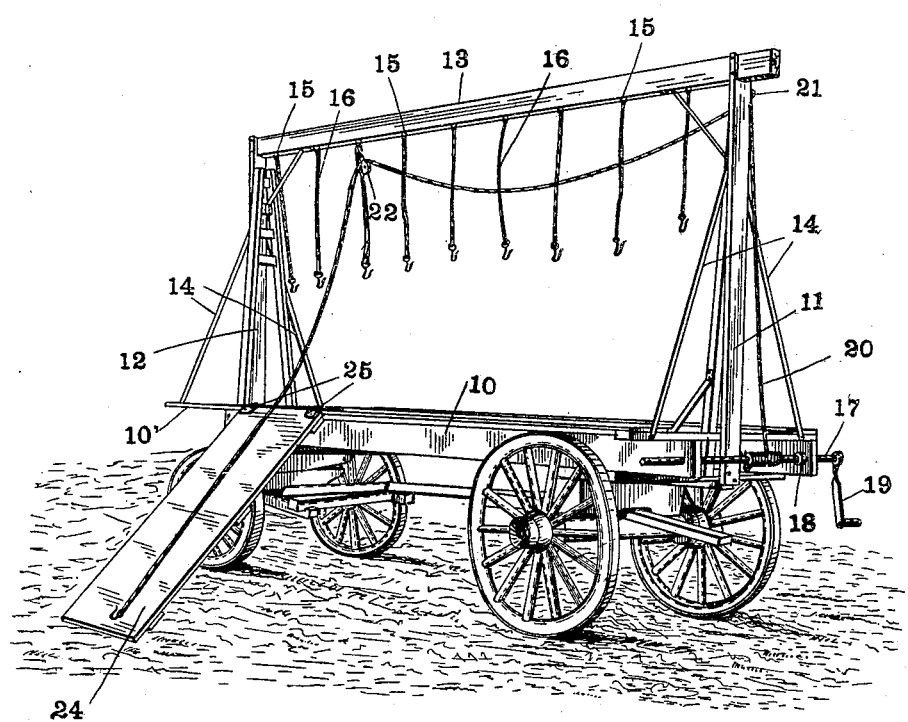
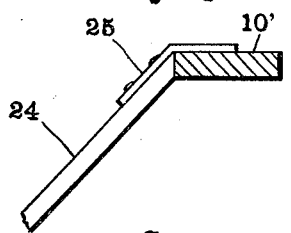
Witnesses
Frank A. Fahle
J. A. Walsh
Inventor
James B. Schuman
By
Bradford & Hood
Attorneys

UNITED STATES PATENT OFFICE.

JAMES B. SCHUMAN, OF COLUMBIA CITY, INDIANA, ASSIGNOR TO THE SCHUMAN COMPANY, OF INDIANAPOLIS, INDIANA, A CORPORATION OF MAINE.

SHOCK-LOADER.

938,438.   Specification of Letters Patent.   Patented Oct. 26, 1909.

Application filed October 31, 1902, Serial No. 129,530. Renewed February 8, 1908. Serial No. 414,981.

*To all whom it may concern:*

Be it known that I, JAMES B. SCHUMAN, a citizen of the United States, residing at Columbia City, in the county of Whitley and State of Indiana, have invented certain new and useful Improvements in Shock-Loaders, of which the following is a specification.

The object of my invention is to produce means for loading shocks of corn or other material onto a wagon or a portable platform in an upright position, and holding them in such position during transportation and by such means that, when the proper destination has been reached, as for instance at a point near a shredder, the shocks may be lifted bodily from said portable platform and deposited upon the ground, in position where they may be readily reached and lifted upon a feeding platform, such for instance as is described and claimed in my pending application Serial No. 124941 the arrangement being such that the portable platform or wagon may be returned to the field and re-loaded during the time that the first load is being cared for by the shredder.

The accompanying drawings illustrate my invention.

Figure 1 is a perspective view; Fig. 2 a detail of the guiding sheave and attaching means; and Fig. 3 a detail of a means for supporting the upper end of the inclined platform.

It is my desire to produce a mechanism which may be built for a comparatively small sum, and I have therefore shown the same as being made of parts which may be readily attached to an ordinary hay wagon body such as is ordinarily owned by every farmer.

In the drawings 10 indicates a portable platform, which is illustrated as being of the usual hay-wagon type. Secured to opposite ends of this body are uprights 11 and 12 the upper ends of which are connected by a longitudinal beam 13, the uprights 11 and 12 being suitably braced by any suitable means such as braces 14. Secured to beam 13 preferably on the under side is a plurality of eyes 15 to each of which may be secured a short piece of rope or chain 16.

Mounted at one end or the other of platform 10 is a windlass of any desired pattern, said windlass for the sake of economy preferably consisting of a piece of shafting 17 journaled in the side-bars of the body 10, and held in position by any suitable means such as collars 18, only one of which is shown. Shaft 17 may be turned by a suitable crank 19 secured to one end, and secured to said shaft is one end of a lifting cable 20. Cable 20 passes through an eye or pulley block 21 carried by the upper end of the upright 11, and from thence through a snatch-block 22 which may be detachably connected to any one of the eyes 15 by any suitable means such as the snap hook 23. In order to facilitate the lifting of the shock, and to guide the same to proper position on body 10 I provide an incline 24 the upper end of which is provided with a pair of fingers 25 25 adapted to embrace the usual running board 10' of platform 10.

In operation, the platform is driven to the field and alongside of a shock; incline 24 adjusted opposite the shock, and snatch-block 22 connected to that eye 15 which is most nearly in line with the incline 24 and shock. Thereupon cable 20 is passed around the shock, or preferably is connected to a chain embracing the shock, and by winding the shaft 18 the shock may be drawn up the incline onto the wagon body in an upright position, one edge of the bottom of the shock coming approximately to the middle of the wagon bed. Thereupon the appropriate rope or chain 16 may be used to either pass around the shock to hold it in position, or to attach to the usual binding cord which is used to hold the shock in form in the field. When the shock is secured in position on the platform, the platform is brought adjacent another shock, and the operation is repeated. In unloading, the ropes are unhooked, and the shocks shoved off the platform. As a consequence it is not necessary for my shock loader to remain at the shredder while its load is being fed through the shredder, but on the contrary the load may be deposited upon the ground, and the loader returned to the field for a new load, which may be returned to the shredder by the time the original load has been run through the shredder. By this time a very material saving in labor and time is obtained.

I claim as my invention.

1. In a shock loader, the combination, with a portable platform, of a longitudinal beam attached thereto and suspended thereover by means capable of holding the same fixedly with relation to the platform, a plurality of means from which a lifting cable may be supported distributed along said beam, and to which deposited bundles may be attached and a windlass for operating said lifting cable, substantially as and for the purpose set forth.

2. In a shock loader, the combination, with a portable platform, of a windlass, a cable attached thereto, a guide or snatch block through which said cable is passed, a beam arranged above the platform and supported by means capable of holding it in fixed relation to said platform, and means carried by said beam for detachably supporting the guide or snatch block above said platform at various points along the length of the beam and to which means deposited bundles may be attached.

3. In a shock loader, the combination, with a portable platform, of a longitudinal beam attached thereto and suspended thereover by means capable of holding it in fixed relation to the platform, a plurality of means from which a lifting cable may be supported distributed along said beam, a windlass for operating said lifting cable, and an incline arranged to rest at one end on the ground and at the other end to rest at any desired point along either edge of the platform, substantially as and for the purpose set forth.

4. In a shock loader, the combination, with a portable platform, of a windlass, a cable attached thereto, a guide or snatch-block through which said cable is passed, a plurality of means for detachably supporting said guide or snatch-block above said platform at various points along the length, and an incline arranged to rest at one end on the ground and at the other end to rest at any desired point along either edge of the platform, substantially as and for the purpose set forth.

5. In a shock-loader, the combination, with a portable platform, of a longitudinal beam attached thereto and suspended thereover, a plurality of eyes distributed along said beam, a cable attached to each of said eyes, a windlass, a lifting cable, and a lifting cable guide or snatch-block provided with means by which it may be detachably secured to any one of said eyes, substantially as and for the purpose set forth.

6. In a shock loader, the combination, with a portable platform, of a longitudinal beam attached thereto and suspended thereover by means capable of holding the same fixedly with relation to the platform, and a plurality of supporting means distributed along said beam from which a lifting cable may be supported.

7. In a shock loader, the combination, with a portable platform, of a longitudinal beam attached thereto and suspended thereover by means capable of holding the same fixedly with relation to the platform, a plurality of eyes distributed along said beam, a snatch block provided with means by which it may be detachably secured to any one of said eyes, and a lifting cable passing through said snatch block.

8. In a shock loader, the combination with a portable platform, an elevated support, mounted at or near each end thereof, a longitudinal beam attached thereto, single means for elevating a plurality of shocks above the platform, and a plurality of means for sustaining a plurality of shocks in upright position on the platform.

9. In a shock loader, the combination with a portable platform, of single means for elevating a plurality of shocks above said platform, and a plurality of means for sustaining a plurality of shocks on said platform.

10. In a shock loader, the combination with a portable platform, single means for elevating a plurality of shocks above said platform, means for guiding and supporting said single means, and a plurality of means for sustaining a plurality of shocks on said platform.

11. In a shock loader, the combination with a portable platform, a plurality of elevated supports mounted on said platform, a connection between the said supports, a single means, movably supported, for elevating a plurality of shocks, and a plurality of means arranged to support shocks.

12. In a shock loader, the combination, with a portable frame-work, a plurality of elevated supports mounted thereon, a connection between the said supports, single means movably supported for elevating a plurality of shocks, and means arranged to support a plurality of shocks.

13. In a shock loader, the combination with a portable frame, a plurality of separate elevated shock supports mounted thereon, a connection between the said supports, single means movably supported for elevating a plurality of shocks, winding mechanism for operating said single means, and means arranged to support a plurality of shocks.

14. In a shock loader, the combination with a portable frame-work, a plurality of separate elevated shock supports mounted thereon, a connection between said supports, single means movably supported for elevating a plurality of shocks, means arranged to support a plurality of shocks, and an adjustable incline associated with said platform.

In witness whereof, I have hereunto set my hand and seal at Indianapolis, Indiana, this 26th day of September, A. D. one thousand nine hundred and two.

JAMES B. SCHUMAN. [L. S.]

Witnesses:
CHESTER BRADFORD,
JAMES A. WALSH.